United States Patent [19]

McManigal

[11] Patent Number: 5,327,178

[45] Date of Patent: Jul. 5, 1994

[54] STEREO SPEAKERS MOUNTED ON HEAD

[76] Inventor: Scott P. McManigal, 16 Inverness La., Newport Beach, Calif. 92660

[21] Appl. No.: 70,248

[22] Filed: Jun. 2, 1993

Related U.S. Application Data

[63] Continuation-in-part of Ser. No. 716,395, Jun. 17, 1991, abandoned.

[51] Int. Cl.$^5$ .................... G02C 1/00; H04M 1/05
[52] U.S. Cl. .................... 351/158; 381/183
[58] Field of Search ............ 359/158, 41, 111; 381/183, 187; 455/344, 350-351

[56] References Cited

U.S. PATENT DOCUMENTS

| | | |
|---|---|---|
| 1,714,377 | 5/1929 | Kiernan . |
| 2,337,953 | 12/1943 | Wirsching . |
| 2,424,935 | 7/1947 | Kimmel . |
| 2,501,107 | 3/1950 | Volkmann . |
| 2,573,132 | 10/1951 | French . |
| 2,586,644 | 2/1952 | Gilbert . |
| 2,641,327 | 6/1953 | Balmer . |
| 2,830,132 | 4/1958 | Borg . |
| 2,856,466 | 10/1958 | Gustafson et al. . |
| 2,874,230 | 2/1959 | Carlson . |
| 3,297,832 | 1/1967 | Brown . |
| 3,588,384 | 6/1971 | Negley . |
| 3,667,569 | 6/1972 | Mackey et al. . |
| 3,807,526 | 4/1974 | Sygnator . |
| 3,836,732 | 9/1974 | Johanson et al. . |
| 3,856,007 | 12/1974 | Leight . |
| 3,871,372 | 3/1975 | Bivins . |
| 4,092,502 | 5/1978 | Jones . |
| 4,189,788 | 2/1980 | Schenke et al. . |
| 4,420,657 | 12/1983 | Larkin . |
| 4,485,276 | 11/1984 | Sato . |
| 4,499,593 | 2/1985 | Antle . |
| 4,538,034 | 8/1985 | French . |
| 4,542,803 | 9/1985 | Houng . |
| 4,633,498 | 12/1986 | Warnke et al. . |
| 4,683,587 | 7/1987 | Silverman . |
| 4,888,805 | 12/1989 | Karppala, Jr. . |
| 4,901,355 | 2/1990 | Moore . |
| 4,902,120 | 2/1990 | Weyer . |

Primary Examiner—Loha Ben
Assistant Examiner—James Phan
Attorney, Agent, or Firm—William W. Haefliger

[57] ABSTRACT

In combination with support structure attachable to an upper portion of the user's head, the improvement comprising a first loudspeaker carried by the support structure in offset, proximate relation to the ear opening of one of the user's ears, the loudspeaker having an input to receive electrical signals from a signal source; the speaker having an audio output side, and the offset relation characterized in that the output side faces toward the ear opening and has spacing from the opening by an amount between about ½ and 1 inch when the support structure is attached to the user's head; the support structure including an ear stem of eyeglasses, and the support structure including a closed loop sleeve on and having slidable connection with the stem, whereby the sleeve is adjustably slidable along the stem and rotatable thereabout to bring the loudspeaker into a position corresponding to the offset proximate relation to the ear opening, to be retained in the position, the sleeve being resiliently deformable and expandable to grip the stem, as the sleeve is rotated about the stem.

6 Claims, 7 Drawing Sheets

STEREO SPEAKERS MOUNTED ON HEAD

BACKGROUND OF THE INVENTION

This application is a continuation in part of Ser. No. 07/716,395 filed Jun. 17, 1991, now abandoned.

This invention relates generally to an audio signal loudspeaker or loudspeakers carried by a human head, and more particularly to simple, effective support or positioning of such a speaker or speakers to optimize reception by the user's ear of sounds from both the speaker or speakers, and also from other sound sources.

Personal portable stereo equipment is now very popular with people from many walks of life. Current personal portable stereos allow the user to listen to music easily, no matter where he or she goes, as in athletic activities, such as jogging and biking. There are two types of lightweight, personal stereo headphones currently in use. The first is the foam, "over-the-ear" device that includes a lightweight headband, two foam-covered speakers, and flexible leads connecting to the audio source. Problems associated with such devices include their unsightliness as they resemble ear muffs. Also, the flexible metal band that connects the speakers prohibits the user from wearing a hat or helmet. Lastly, since the speakers completely cover both ears for maximum audio clarity, no exterior sounds can be heard, thereby making the user oblivious to his surrounding environment and placing him in danger from a variety of sources.

The second type of portable stereo headphone device is the "in-the-ear" model. This type of speaker does not necessarily need a restraining metal band, so each speaker is separate. The very small speaker is placed inside the ear canal and remains there by forcefully being wedged into the small opening of the inner ear. Such a speaker is uncomfortable to the user if worn for any length of time. Furthermore, if the user is participating in athletic activity, it is difficult to keep the speaker in place, and it frequently falls out of the ear. The user usually resorts to jamming the speaker even further into the ear, causing much pain. Also, like the over-the-ear speakers, the in-the-ear speaker inhibits the user from hearing exterior sounds, making this type of speaker dangerous as well.

A new danger has arisen with the increasing popularity of car telephones. When using a car phone, an automobile operator's attention is not where it should be, on the road. The user in most cases must use one hand to hold the phone and one for driving. Some speaker phones that allow hands-free operation are available on the market, but they severely lack audio clarity and quality. Also on the market is a directional microphone that affixes to the car to be used with a car phone. The microphone points toward the user's head and picks up his voice, eliminating the need for a hand-held microphone unit. What is needed is a speaker system to be used in conjunction with such a microphone, and that allows the user to hear the other phone user without blocking environmental sounds around the automobile, such as sirens, horns, etc.

U.S. Pat. No. 4,901,355 to Moore discloses use of clamps, transverse apertures, lead loops, and variable positions of speakers to attach a personal audio assembly to eyeglasses or headgear. In the embodiment of Moore's invention, the speakers hang on straps from clamps on the earn stems and are free to flop around the user's movement, resulting in irritating contact with the ears and variable audio volume. The device of U.S. Pat. No. 4,902,120 to Weyer, on the other hand, while achieving fixed position of speakers, still results in ear contact and blockage of environmental sounds.

Aside from the above-mentioned problems associated with Moore's and Weyer's headphones, the safety factor of wearing such headphones is an unsolved problem. Bikers, Joggers, or automobile operators wearing such devices cannot hear what is going on around them, such as sirens, voices, horns, etc. California State Law prohibits automobile operators and bicycle riders from wearing such devices as when using their vehicles. Nevertheless, infractions of the law are common. This is caused by the fact that people enjoy privately listening to music as they drive or pursue athletic activities. Since there is no alternative speaker on the market, people choose to break the law and put themselves and others at great danger rather than go without their personal stereos. What is needed is a speaker assembly that is of high quality, comfortable to wear, securely attachable to the head for vigorous activity, and most importantly, one that allows the user to hear sounds from the worn audio source as well as exterior sounds emanating from the surrounding environment. There is also need for an adjustment system that prevents the speaker from blocking the ear opening and cutting off environmental sounds.

SUMMARY OF THE INVENTION

It is a major object of the invention to provide an improved loudspeaker system, and associated equipment, meeting the above need. Basically, the invention is embodied in a combination with a support member attachable to an upper portion of the user's head and that extends generally forwardly toward the user's face, of the improvement comprising a) a first loudspeaker carried by the member in offset, proximate relation to the ear opening of one of the user's ears, the loudspeaker having an input to receive electrical signals from an audio source, b) the speaker having an audio output side, and the offset relation characterized in that said output side faces toward the ear opening and has spacing from that opening by an amount between about ½ and 1 inch when the member is attached to the user's head.

It is another object of the invention to provide the support member in the form of an eyeglass ear stem, to which the support member may be integrally or adjustably connected.

In one embodiment of the invention, the speaker assembly is permanently attached in a predetermined position on the ear stem of the eyeglasses. In a second embodiment of the invention, a detachable speaker assembly is used in conjunction with a specially prepared ear stem, made to accept the speakers. This embodiment is convenient for the user since the speaker assembly may be removed when not in use, or when attachment is not desired. In a third embodiment, the speaker assembly is detachable from the ear stem, but the ear stem is unprepared for attachment. This embodiment makes the speaker assembly compatible with any type or size of eyeglasses. Means for such attachment include a slotted member attached to the speaker assembly that slides over the ear stem, and secures in place.

In a fourth embodiment, each speaker is permanently attached to an expandable sleeve which slips over the eyeglasses ear stem and holds the speaker in an individually selected position. This allows for compatibility with any size or kind of eyeglasses. In the fifth and sixth embodiments, the speaker assembly is permanently attached to a lightweight, flexible headband. These embodiments also differ from conventional headphones because the speaker members do not come in contact with the ears, the speaker members positioned close by and, preferably, in front of the ears, thereby allowing environmental sounds to be heard. The user is thus able to enjoy music through a personal stereo or other audio source, while allowing environmental sounds to be heard, for safety.

The invention also permits use of such speakers without the user having to wear eyeglasses to support the speakers. In this regard, in the fifth embodiment, the headband fits over the head; while in the sixth embodiment, the band extends around the head from back to front.

Yet another object is the provision of removable attachment of a loudspeaker to an eyeglass stem by one of the following:

i) pin and hole elements, one on the member and the other on the stem,
ii) male and female snaps, one on the member, and the other on the stem,
iii) VELCRO elements, one on the member and the other on the stem.

A further object includes the provision of a microphone directed toward the user's head within a motor vehicle, and affixed to structure within the vehicle, the first loudspeaker carried by the member which is in turn carried by the user's head.

These and other objects and advantages of the invention, as well as the details of an illustrative embodiment, will be more fully understood from the following specification and drawings, in which:

DRAWING DESCRIPTION

FIG. 1b is a side view taken on lines 1b—1b of FIG. 1a;

DETAILED DESCRIPTION

The general objective of the present invention is to give the individual quality sound from a personal audio source, without speakers touching the ears, and/or without interfering and blocking surrounding sounds from the environment. The position of the audio elements is fixed so that the volume of the sound is constant, independent of movements of the listener.

Figure 1A:
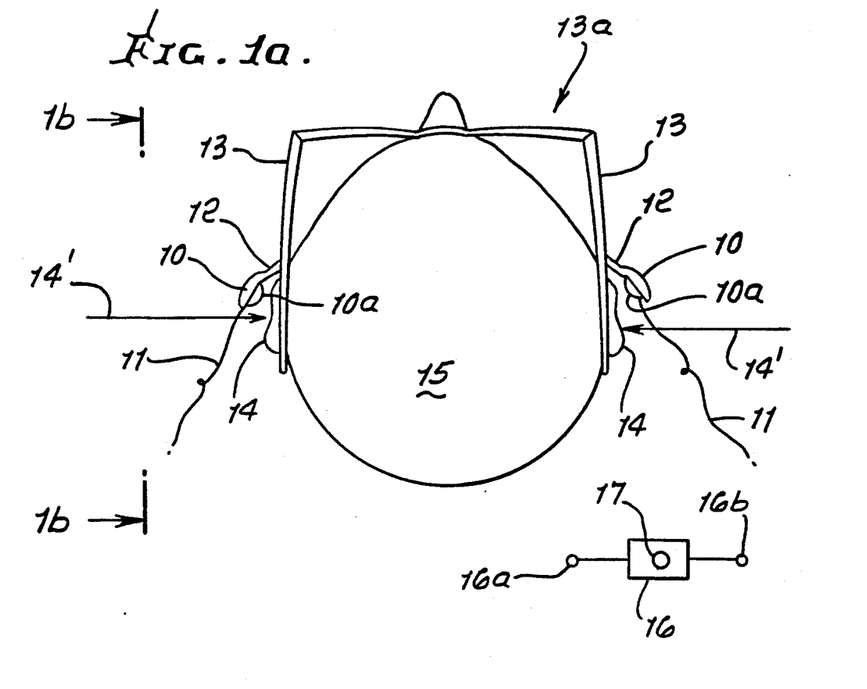
FIG. 1a is a top view of a user's head showing the general position of the head, eyeglasses, speakers, and elbow support members holding the speakers.
Figure 1B:
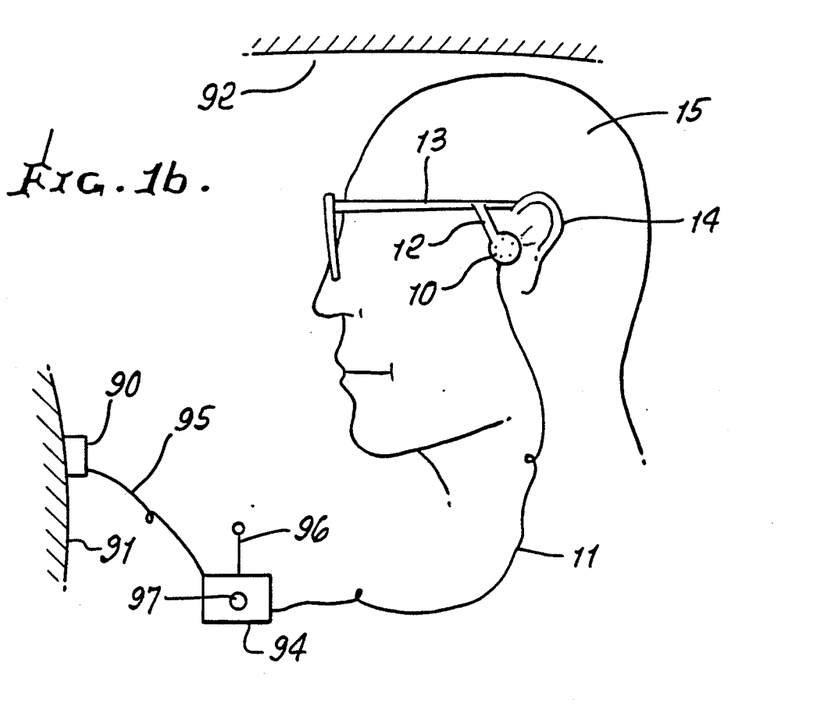

The general arrangement is shown in FIGS. 1a and 1b. The speakers 10, energized through the flexible leads 11, are mounted on the ear stems 13 of the eyeglasses 13a by the elbows 12. The speakers 10 are shown generally in front of the ears 14 and at a fixed distance or distances away from the head 15, and from the ears, and from the ear openings. Each speaker is typically positioned about ½ to 1 inch forward of the ear opening and ½ to 1 inch to the outside of that opening. The sound-emitting side 10a of each speaker is pointed toward or faces the ear, but never touches the ear, so that the eyeglasses may be worn for long periods of time without ear fatigue commonly caused by other types of earphones. Furthermore, while the invention permits extremely good audio fidelity, surrounding environmental sounds are easily heard, as via path 14'. An audio source, such as a radio, is seen at 16, volume adjustable at 17, and having stereo outputs at 16a and 16b, connectible with leads 11.

The speakers are preferably located outward from the head and forward of the ears since listeners are generally used to listening to entertainment audio sources in front of the ear, yielding a natural orientation to the sound source.

The optimum distance is found by considering the following constraints:

1. Ease of fitting and low inventory, or one-size-fits-all without requiring a multitude of adjustments. (Multiple adjustments in position and angle of the speaker are mandatory if the speaker is to be at or very near the ear, as in prior devices, such devices being prone to slip and get out of adjustment especially while the user is active, such as while biking.) In the present invention, the speaker is far enough from the ear that small variations in the position of the ear opening are minimal with respect to the maximum fidelity zone of the speaker. If one considers anatomical variations of the ear position, but limits ear sampling to the set of persons on whom a given set of eyeglasses "fit" well enough to be comfortable, the variation is about 0.5 inch diameter, to include the vast majority of people. The maximum fidelity zone of a speaker is a cone in front of the speaker which is about 60 degrees in full angle. If one demands that all 98 percent of the ears in the above sample are in the maximum fidelity zone, then the distance from the speaker to the ear must be at least about 0.5 inch.

2. Enough volume to hear without distortion. The audio source 16 and the speakers 10 should produce enough volume so that the audio source can easily be heard over the background noises. Available speakers as in personal tape units or radios can be heard easily at 1 inch distance from the ear, at volume levels that present little distortion. The volume varies inversely with the square of the distance. At the distance of 3 inches, the volume requirement has increased almost by an order of magnitude. Most common units cannot broadcast quality sound that far without being hard to hear, the user being outdoors pursuing activities such as biking and running, or driving in traffic.

3. Speakers awkward and in the way. As the distance from the head increases, the speakers look unattractive and awkward and the probability of unwanted impacts greatly increases. At an extreme, if the speakers are far enough from the ears and diagonally forward of the ears, they are visible from the wearer's eyes and create visible blind spots. Speakers 3 inches away from the head are substantially more awkward than at a distance of 1 inch from the ear.

4. Cut off of environmental sounds. If the speakers are too close to the ear or in the ear, then environmental sounds can be overcome by output from the speakers. Of course, the volume interplays with the distance so that a specific inner cut-off is not at all sharp. However, it is found that at least 0.5 inch is needed to allow adequate hearing of environmental sounds.

5. Laws. The speaker system should be compatible with laws which prevent vehicle operators, including bikers, from wearing earphones. Again, at least 0.5 inch is a practical minimum in order for enforcement to be practical.

In recognition of the above factors, the preferred region from about 0.5 inch to about 1.5 inch from the ear opening from the ear is most practical and desirable.

Figure 2:
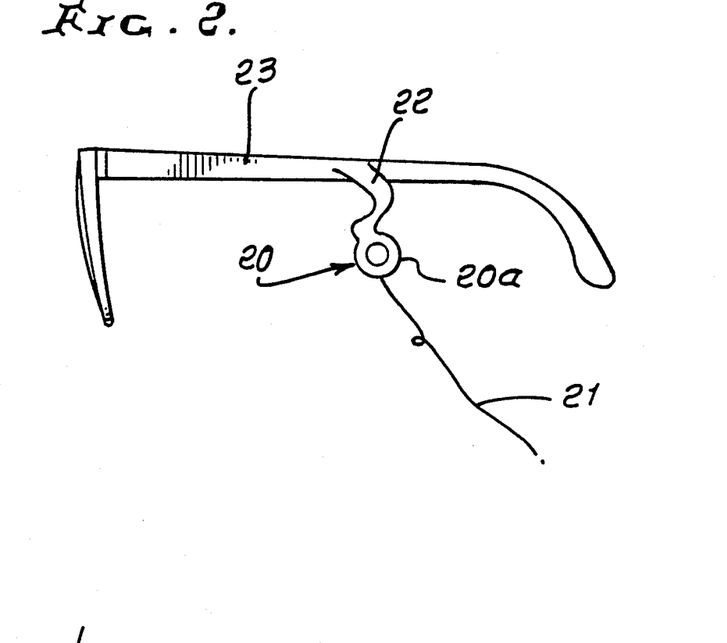
FIG. 2 is a side view of the apparatus incorporating the present invention, permanently attached and built in to the ear stems of eyeglasses.

The embodiment of the invention shown in FIG. 2 comprises a speaker assembly 20 permanently attached to either eyeglass or sunglass ear stem 23 by speaker elbow 22. Ear stem 23, speaker elbow 22 and speaker housing 20a may be one manufactured piece, made by injection molding plastic. Flexible lead 21 extends from speaker assembly 20 to a personal stereo unit, car phone, or other audio source not shown. Speaker elbow 22 has two purposes: to attach speaker assembly 20 to ear stem 23, and also to locate speaker assembly 20 at optimal spacing from the user's ear for the best possible clarity of sound. See above discussion of FIGS. 1a and 1b, and spacing criteria.

Figure 3:
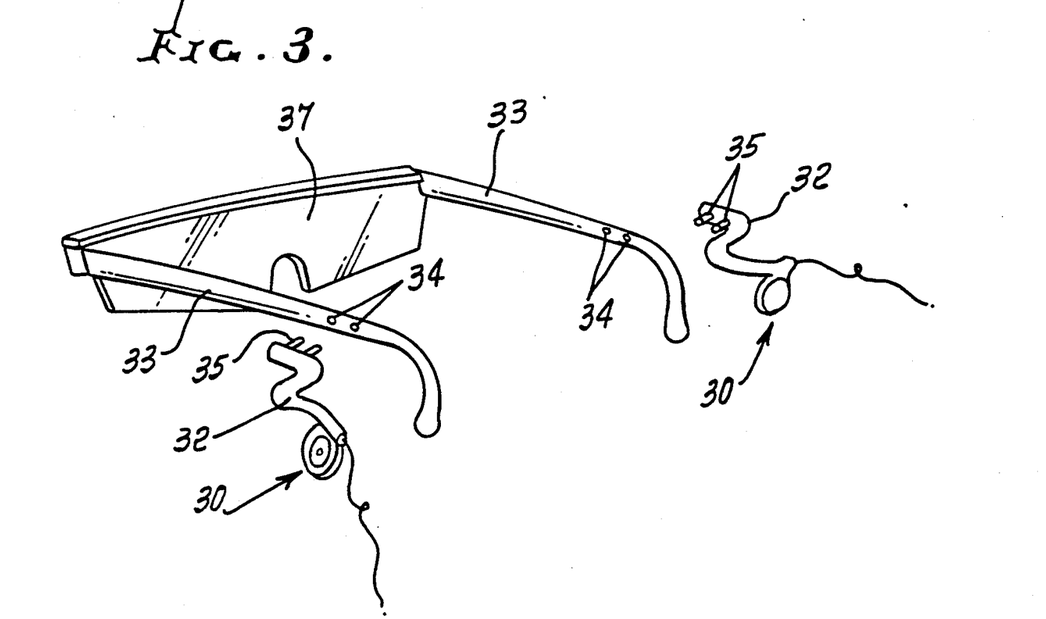
FIG. 3 is a perspective view of eyeglasses with prepared ear stems having holes pre-drilled, detachable speaker and support assemblies with pins also being shown.

The second embodiment of the invention is shown in FIG. 3, and includes detachable speaker assemblies 30 that can be firmly attached to either eyeglass or sunglass ear stems 33. Each ear stem 33 is prepared to carry a speaker assembly 30 by means of holes 34 drilled into the ear stem at a specific location for optimal positioning of speaker assembly support elbows 32. Each support (member) elbow 32 connects a speaker assembly 30 to an ear stem 33 as by two pins 35 on the elbow that fit into ear stem holes 34 in ear stem 33, and spaced lengthwise thereon. Flexible lead 31 connects speaker assembly 30 to personal stereo unit, car phone, or other audio sources, which are not shown, but which are seen in FIG. 1. Other manner of detachable connection of 32 to 33, such as VELCRO, slide locks, and male-female snaps are also possible for this embodiment of the invention. (Elements 34 and 35 may be considered to represent same.) The eyeglasses also include panes 37 and ear hooks 38. Elbows may be generally S-shaped, as shown, to attach lengthwise to both 30 and 33.

Figure 4:
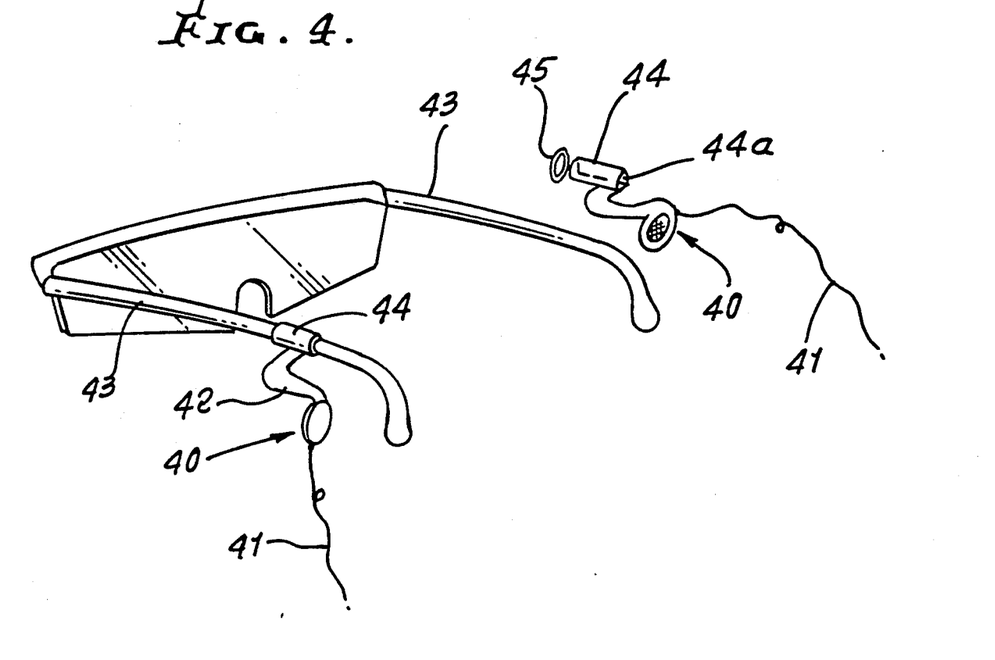
FIG. 4 is a perspective view showing eyeglasses with detachable, adjustable, slotted speaker support members.

The third embodiment of the invention is shown in FIG. 4 and consists of detachable speaker assembly 40 that can be firmly attached to eyeglass or sunglass ear stem 43. Since S-shaped elbow 42 is adjustable, along the stem, this embodiment is compatible with a wide variety of ear stem 43 sizes and shapes. Ear stems 43 need not be specially prepared to allow for slotted collars. Each slotted collar 44 is grooved at 44a to accommodate an ear stem 43 and to be firmly secured by tightening means 45 (such as a clamp ring that fits over the stem and over the collar). Elbow 42 connects speaker assembly 40 to ear stem 43, via collar 44, and at a spaced position from the ear opening, as discussed above, to allow optimum audio clarity and hearing of external sounds. Flexible lead 41 connects speaker assembly 40 to personal stereo unit, car phone, or other audio sources not shown.

Figure 5:
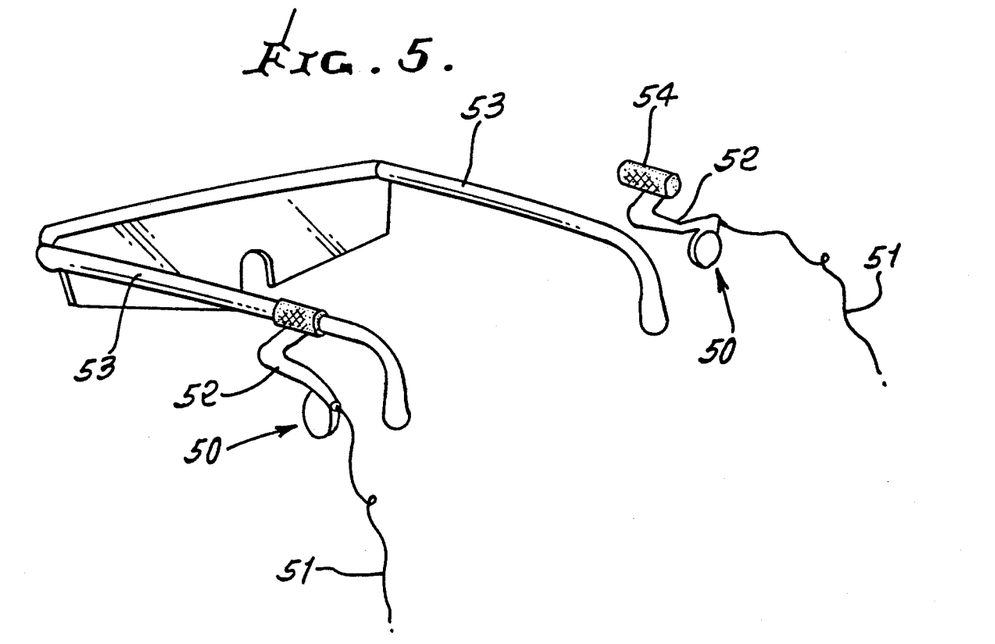
FIG. 5 is a perspective view showing eyeglasses with detachable, expandable speaker supporting sleeves as they slide onto ear stems.

The fourth embodiment is shown in FIG. 5, and comprises a detachable speaker assembly 50 that can be selectively attached to eyeglass or sunglass ear stem 53. Since elbow 52 is adjustable along the stem 53, that stem need not be specially prepared to allow for attachment of expandable sleeve 54. Expandable sleeve 54 consists of a resiliently stretchable material that is manually adjustable on and along the ear stem 53 to desired position, i.e., to a position as discussed above in FIG. 1, the sleeve resiliently gripping the stem. Speaker elbow 52 connects speaker assembly 50 to sleeve 54, which attaches to ear stem 53 in a position to allow optimum audio clarity, as well as ear reception of environmental sounds. Flexible lead 51 connects speaker assembly 50 to personal stereo unit, car phone, or other audio sources not shown.

Figure 6A:
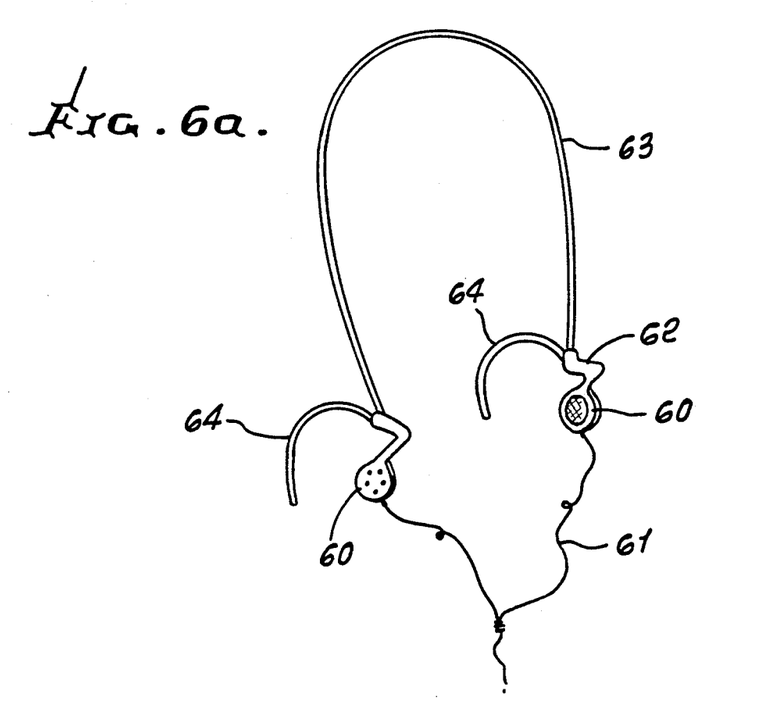
FIGS. 6a, 6b, and 6c are perspective views showing loudspeakers on a lightweight, flexible headband, which extends over the head, with speaker positioning supports.
Figure 6B:
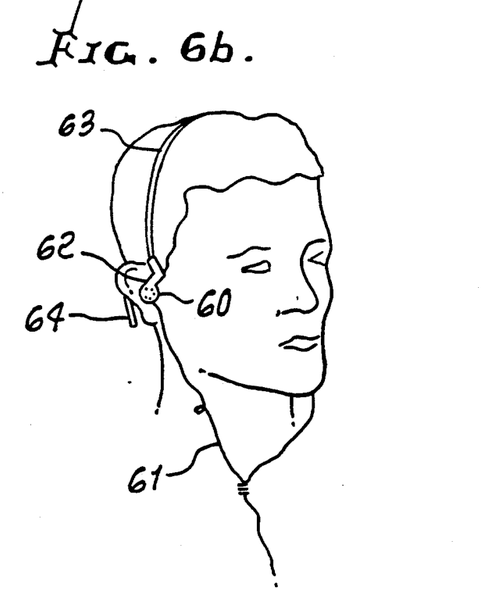
Figure 6C:
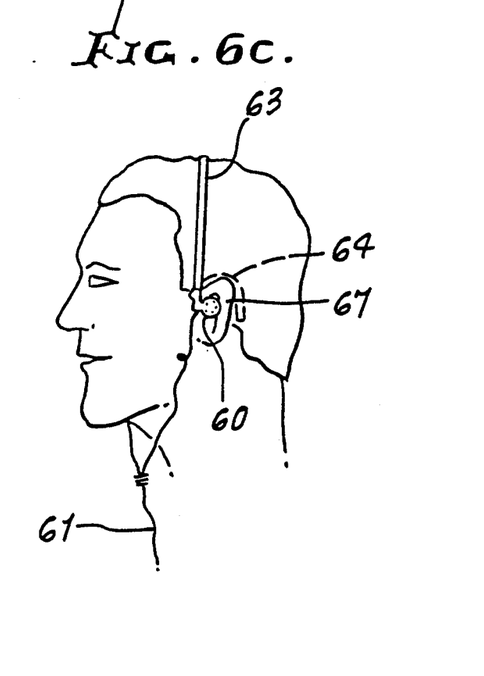

The fifth embodiment is shown in FIGS. 6a–6c wherein permanent speaker assembly 60 is attached to a lightweight, flexible headband 63 by speaker elbow 62 that connects in a manner to position speaker assembly 60 close by, but not touching the user's ears, and at optimal spacing, as referred to above. Resiliently flexible speaker position supports 64 attach to speaker elbows 62 and fit about the wearer's ears 67 to stabilize headband 63 and speaker assembly 60 at optimal position or positions relative to the user's ears, as referred to fin FIG. 1. Speaker position supports 64 bend around the back of the user's ears to secure the band 63 to fit upwardly and over the user's head. Flexible leads 61 connect speaker assemblies 60 to personal stereo unit, car phone, or other audio sources.

Figure 7A:
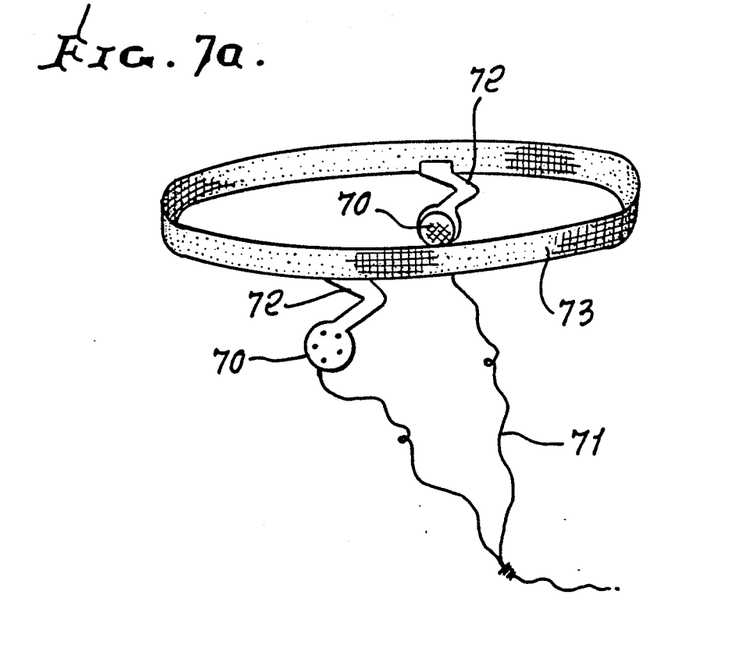
FIGS. 7a, 7b, and 7c are perspective views showing speakers on a lightweight, flexible headband which goes around the head from the forehead to the back of the head, with speaker positioning supports.
Figure 7B:
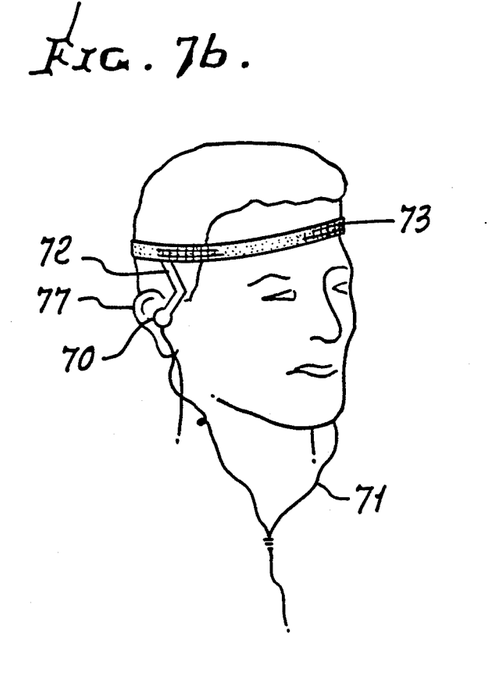
Figure 7C:
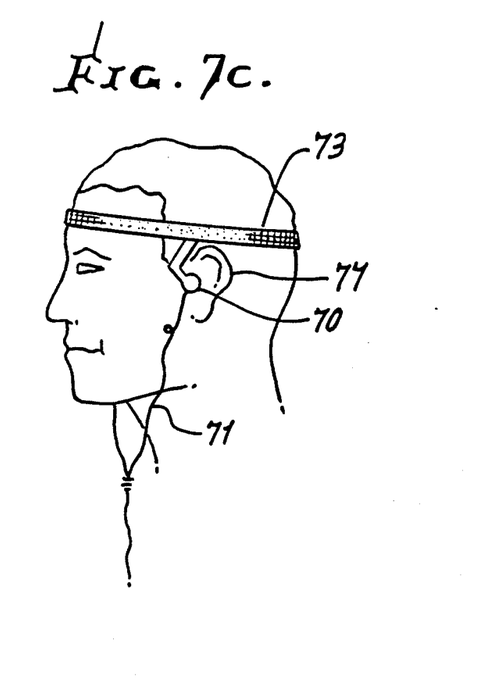

Another embodiment is shown in FIGS. 7a–7c, wherein permanent speaker assembly 70 is attached to a lightweight, horizontally extending, flexible headband 73 by speaker support elbow 72 that connects in a manner to position speaker assembly 70 close by, but not touching the user's ears 77. Headband 73 circles the user's head starting at the rear of the head, passing immediately over the user's ears and extending forwardly therefrom around the front of the head. Flexible lead 71 connects speaker assembly 70 to personal stereo unit, car phone, or other audio sources not shown.

Referring back to FIG. 1b, a microphone 90 is shown as connected to vehicle structure 91, as for example structure within a vehicle compartment 92. Radio circuitry is shown at 94 connected at 95 with the microphone, and at 11 with the speaker 10. A radio antenna appears at 96, and a control means (volume, on-off, frequency) appears at 97. The user can listen to incoming calls via 94, 96 and 10, while also hearing environmental sounds; and he can transmit via microphone pick up 90, circuitry 94 and antenna 96.

Figure 8A:
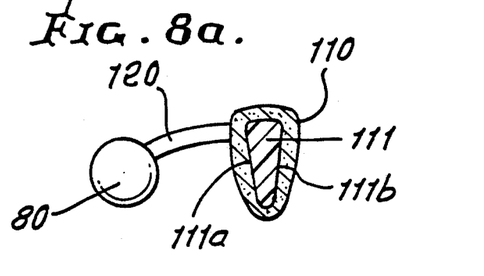
FIG. 8a is a section showing a speaker mounted on a sleeve which is rotatable on a stem.

In FIG. 8a a normally cylindrical, closed-loop sleeve 110, which is expandable, stretchable, and deformable, is applied over and onto a stem 111 of an eyeglasses. The stem may have any cross-sectional shape, and is shown as downwardly wedge-shaped, with opposite tapered walls 111a and 111b, for purposes of illustration. The sleeve is deformed to the shape conforming substantially to the exterior shape of the stem to grip the stem, as shown. The sleeve grips the stem to hold the loudspeaker 80, via elbow 120, in the critical position near the user's ear opening (as discussed above), when the eyeglasses are worn, and the stem passes adjacent the user's head and over his ear. The sleeve consists of an elastomer, or a synthetic hydrocarbon, or other material, but is not metallic.

Figure 9:
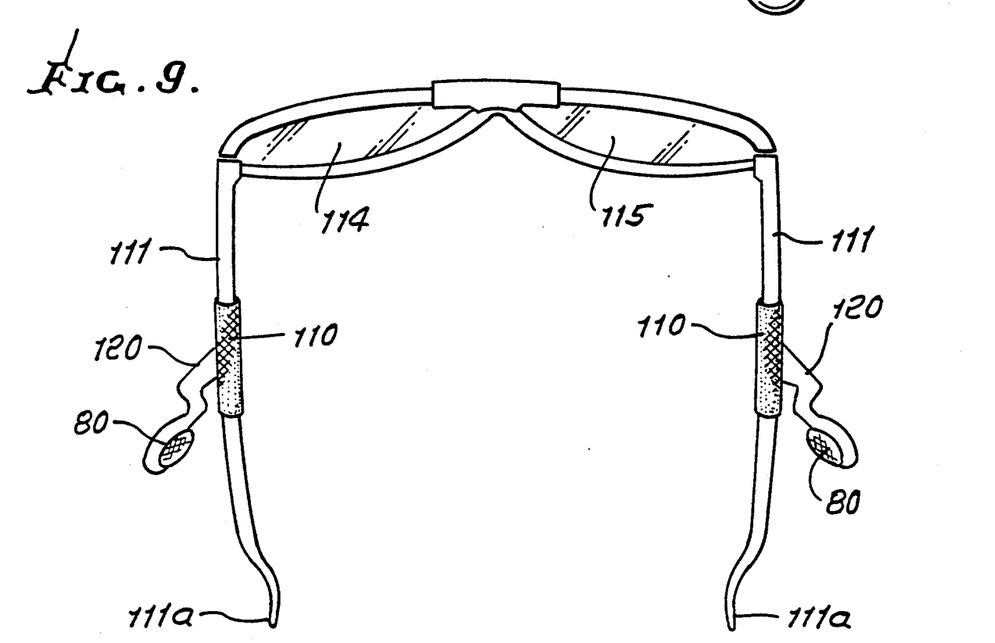
FIG. 9 is a view like FIG. 7a showing sleeves of FIGS. 8a and b type mounted on eyeglass stems.

FIG. 9 shows two such sleeves and loudspeakers mounted on eyeglass stems 111 to project generally oppositely, as would be adjustably worn by the user.

Figure 8B:
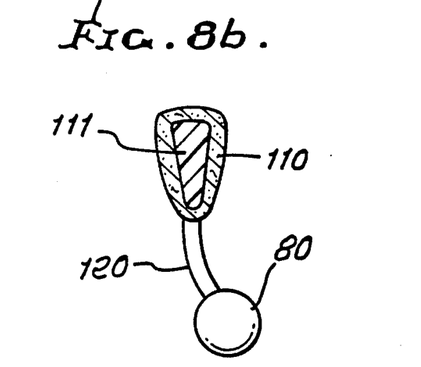
FIG. 8b is a view like FIG. 8a showing a rotated position of the sleeve and speakers.

FIG. 8b shows an adjustably rotated position of the sleeve on the stem, as for example a stored position.

Figure 10:
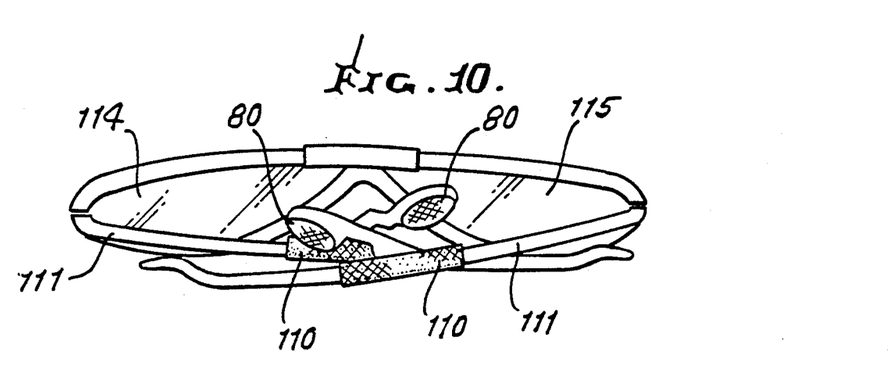
FIG. 10 is a view like FIG. 9 showing stem collapsed position, and speaker and sleeve rotated and collapsed positions.

FIG. 10 shows the stem 111 folded into proximity to the eyeglasses lenses 114 and 115, with the sleeves 110 adjustably rotated about 90° to bring the loudspeakers into proximity to the lenses, for storage. The stretchable, yet stem gripping character of the sleeves permits such adjustable rotation of the sleeves on the stems, as well as sliding along the stems, to adjust the sleeve positions as between extended positions for loudspeaker use near the ears, and retracted stored positions, as seen in FIG. 10. Sliding of the sleeves along the stems is made possible, to best position the loudspeakers relative to the stems and sleeves, for protective storage.

The invention also contemplates assembly of the stretchable sleeves onto the stem, via their terminal ends 111a, which may be enlarged relative to the stem cross section at sleeve locations seen in FIG. 9. Thus, the sleeves can be forcibly pushed over those ends, even if enlarged, and the sleeves can be pushed along the stems and rotated, to adjusted positions.

Accordingly, the invention includes the combination with support means attachable to an upper portion of the user's head, the improvement comprising:
a) a first loudspeaker carried by the support means in offset, proximate relation to the ear opening of one of the user's ears, the loudspeaker having an input to receive electrical signals from a signal source,
b) the speaker having an audio output side, and the offset relation characterized in that the output side faces toward the ear opening and has spacing from the opening by an amount between about ½ and 1 inch when the support means is attached to the user's head,
c) the support means including an ear stem of eyeglasses, and the support means including a closed loop sleeve on and having slidable connection with the stem, whereby the sleeve is adjustably slidable along the stem and rotatable thereabout to bring the loudspeaker into a position corresponding to the offset proximate relation to the ear opening, to be retained in the position, the sleeve being resiliently deformable and expandable to grip the stem, as the sleeve is rotated about the stem.

The invention contemplates the method of assembling a sleeve and loudspeaker as defined in claim 1 onto an eyeglasses stem, the stem having an end terminal, the method including:

i) fitting the sleeve over the stem and terminal by effecting sleeve expansion and sliding over the end terminal,
ii) and sliding the sleeve along the stem, and rotating the sleeve about the stem, to bring the loudspeaker into a position spaced from the ear opening by an amount as defined in claim 1.

The invention contemplates the further step of folding the stem toward the lens means and also rotating the sleeve about the stem and into collapsed and stored position in protected proximity to the lens means.

Figure 11A:
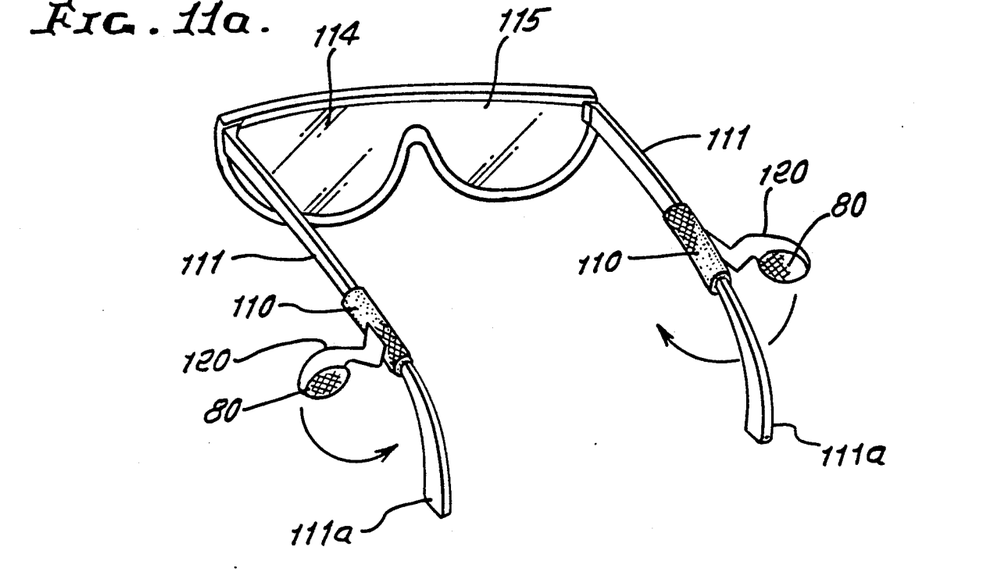
FIGS. 11a and 11b show sleeves rotated on eyeglasses stem.
Figure 11B:
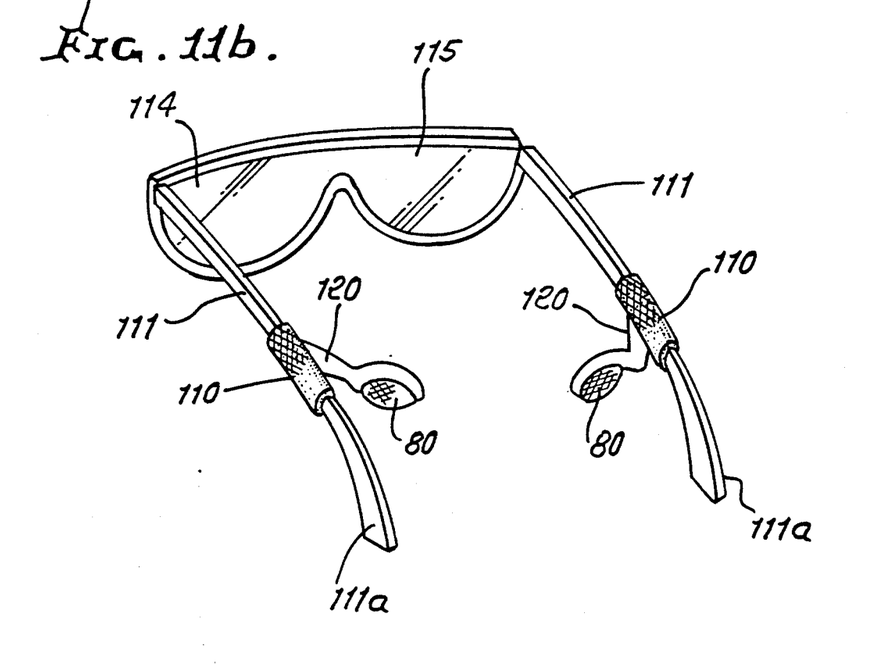

FIGS. 11a and 11b show variously rotated positions of sleeves on eyeglasses stems.

It will further be noted that the sleeve deforms to grip the ear stem and conforms to it. The sleeve, although deformed and conforming, is still free to be manually rotated by the user. However, the sleeve and speakers hold a position even while the unit is on the head of a jogger, for example. One size may fit a variety of glasses. When the unit is being carried in a pocket, for example, speakers are rotated inward so the entire unit is more compact.

I claim:

1. In combination with support means attachable to an upper portion of the user's head, the improvement comprising:
    a) a first loudspeaker carried by said support means in offset, proximate relation to the ear opening of one of the user's ears, the loudspeaker having an input to receive electrical signals from a signal source,
    b) the speaker having an audio output side, and said offset relation characterized in that said output side faces toward said ear opening and has spacing from said opening by an amount between about ½ and 1 inch when said support means is attached to the user's head,
    c) said support means including an ear stem of eyeglasses, and said support means including a closed loop sleeve on and having slidable connection with the stem, whereby the sleeve is adjustably slidable along said stem and rotatable thereabout to bring said loudspeaker into a position corresponding to said offset proximate relation to said ear opening, to be retained in said position, said sleeve being resiliently deformable and expandable to grip said stem, as the sleeve is rotated about the stem.

2. The combination of claim 1 wherein the stem has a non-circular cross section, and the sleeve is deformed by engagement with the stem at said non-circular cross section.

3. The combination of claim 1 wherein the sleeve has a composition selected from the group that includes:
    i) elastomeric material
    ii) synthetic, non-metallic material.

4. The combination of claim 1 including said eyeglasses having lens means and two of said stems, there being one of said sleeves on each stem, and wherein each sleeve and its associated loudspeaker has an extended position on the stem in which the loudspeaker is spaced between about ½ and 1 inch from said ear opening as defined, and a collapsed position in which the stem is folded into proximity to said lens means and the sleeve and its associated loudspeaker has a rotated and stored position relative to the stem and to said lens means in which the loudspeaker is in protected proximity to said lens means.

5. A method of assembling a sleeve and loudspeaker as defined in claim 1 onto an eyeglasses stem, the stem having an end terminal, said method including:
  i) fitting the sleeve over the stem and terminal by effecting sleeve expansion and sliding over said end terminal,
  ii) and sliding the sleeve along the stem, and rotating the sleeve about the stem, to bring said loudspeaker into a position spaced from said ear opening by an amount as defined in claim 1.

6. The method of claim 5 wherein said eyeglasses have lens means, and including the step of folding the stem toward said lens means and also rotating the sleeve about the stem and into collapsed and stored position in protected proximity to said lens means.

* * * * *